(12) United States Patent
Carles (10) Patent No.: US 8,885,825 B2
(45) Date of Patent: Nov. 11, 2014

(54) METHOD OF ESTABLISHING A CRYPTOGRAPHIC KEY, NETWORK HEAD AND RECEIVER FOR THIS METHOD, AND METHOD OF TRANSMITTING SIGNALS

(75) Inventor: Philippe Carles, Meudon (FR)

(73) Assignee: Viaccess, Paris la Defense Cedex (FR)

( * ) Notice: Subject to any disclaimer, the term of this patent is extended or adjusted under 35 U.S.C. 154(b) by 1227 days.

(21) Appl. No.: 12/279,410

(22) PCT Filed: Feb. 21, 2007

(86) PCT No.: PCT/FR2007/000313
§ 371 (c)(1),
(2), (4) Date: Aug. 14, 2008

(87) PCT Pub. No.: WO2007/096522
PCT Pub. Date: Aug. 30, 2007

(65) Prior Publication Data
US 2009/0010434 A1    Jan. 8, 2009

(30) Foreign Application Priority Data
Feb. 22, 2006 (FR) ..................... 06 01564

(51) Int. Cl.
*H04K 1/00* (2006.01)
*H04N 21/64* (2011.01)
*H04N 7/16* (2011.01)
*H04N 21/266* (2011.01)
*H04N 21/472* (2011.01)
*H04L 29/06* (2006.01)
*H04N 21/643* (2011.01)

(52) U.S. Cl.
CPC ............... *H04N 7/165* (2013.01); *H04N 21/64* (2013.01); *H04N 21/26613* (2013.01); *H04N 21/472* (2013.01); *H04L 63/061* (2013.01); *H04N 21/64322* (2013.01)
USPC ............. 380/255; 380/278; 713/168; 726/12; 726/15

(58) Field of Classification Search
CPC .................................. H04L 63/08; H04L 9/08
USPC ........ 380/240, 255, 278; 726/12, 15; 713/168
See application file for complete search history.

(56) References Cited

U.S. PATENT DOCUMENTS

| | | | |
|---|---|---|---|
| 6,252,964 B1* | 6/2001 | Wasilewski et al. | 380/282 |
| 6,678,827 B1* | 1/2004 | Rothermel et al. | 726/6 |
| 6,851,063 B1* | 2/2005 | Boyle et al. | 380/268 |
| 7,239,704 B1* | 7/2007 | Maillard et al. | 380/210 |
| 7,249,186 B1* | 7/2007 | Sitaraman et al. | 709/229 |
| 7,644,442 B2* | 1/2010 | Miller et al. | 726/26 |
| 2002/0019933 A1* | 2/2002 | Friedman et al. | 713/160 |
| 2002/0023174 A1* | 2/2002 | Garrett et al. | 709/245 |
| 2002/0104001 A1* | 8/2002 | Lotspiech et al. | 713/163 |
| 2002/0120840 A1* | 8/2002 | Yellepeddy et al. | 713/156 |

(Continued)

*Primary Examiner* — Zachary A Davis
*Assistant Examiner* — Oleg Korsak
(74) *Attorney, Agent, or Firm* — B. Aaron Schulman, Esq.; Stites & Harbison, PLLC (57) ABSTRACT

This method of establishing a cryptographic session key comprises: a subscription phase (104) during which an identifier of a local loop to the end of which a receiver must be connected is acquired, and an authentication step comprising: a) an operation (142) of automatically obtaining an identifier of the local loop to the end of which the receiver is actually connected, and b) an operation (146) of verifying that the identifier obtained during the operation a) corresponds to the identifier acquired during the subscription phase so as to authenticate the receiver.

20 Claims, 5 Drawing Sheets

(56) References Cited

U.S. PATENT DOCUMENTS

| | | | |
|---|---|---|---|
| 2002/0169988 A1* | 11/2002 | Vandergeest et al. | 713/201 |
| 2003/0026424 A1* | 2/2003 | McGarrahan et al. | 380/255 |
| 2003/0182579 A1* | 9/2003 | Leporini et al. | 713/201 |
| 2004/0117664 A1* | 6/2004 | Colvin | 713/202 |
| 2005/0091492 A1* | 4/2005 | Benson et al. | 713/170 |
| 2006/0048236 A1* | 3/2006 | Multerer et al. | 726/28 |
| 2006/0059508 A1 | 3/2006 | Kamperman et al. | |
| 2006/0184787 A1* | 8/2006 | Sandhu et al. | 713/155 |
| 2007/0022469 A1* | 1/2007 | Cooper et al. | 726/3 |
| 2007/0106892 A1* | 5/2007 | Engberg | 713/168 |

* cited by examiner

METHOD OF ESTABLISHING A CRYPTOGRAPHIC KEY, NETWORK HEAD AND RECEIVER FOR THIS METHOD, AND METHOD OF TRANSMITTING SIGNALS

The present invention relates to a method of establishing a cryptographic key, a network head and a receiver for this method, and a method of transmitting signals.

There are methods of establishing a session key that is common to a network head which transmits scrambled multimedia signals and to a receiver of those scrambled multimedia signals. The receiver is typically capable of unscrambling the scrambled multimedia signals received by means of a check word.

The network head and the receiver are connected to each other by means of a telecommunications network, in which each local loop which constitutes the final portion of each subscriber line is identified in a unique manner among all the local loops by a local loop identifier. The receiver can be connected to the end of any one of those local loops.

A local loop is directly connected, at one side, to a termination location of the network located at the premises of the subscriber to the network and, at the other side, to a telephone distributor which allows a plurality of local loops to be assembled on a single communication channel. The distributors are connected by means of those communication channels to switching centres which are known as the "Central Office". A more precise definition of the term "local loop" may be found in literature relating to telecommunications networks. For example, the technical dictionary of France Telecom defines the local loop in its network as follows: the local loop is the portion between the client and the local centre for connection to the network of France Telecom. Three significant zones are differentiated, the "Branching" portion, the "Distribution" portion and the "Transport" portion.

The Branching portion is the portion connecting the clients to the Concentration locations. Those connections are brought about with low-capacity copper cables.

Beyond the Concentration location, the "Distribution" portion begins. Medium-capacity cables connect the concentration locations to a sub-distributor.

Upstream of the Distribution portion, the "Transport" portion is to be found. Each sub-distributor is connected to a distributor via a high-capacity cable. The distributor centralises the requests from the sub-distributors and transmits the pieces of information with which the SRS switch (Self-Routing Switch) of subscribers provides it. Self-routing switches are themselves capable of connecting the clients.

A definition of this term is also given in French law. Thus, Article L.32 (3b) of the Code of Electronic Post and Communications defines the local loop as the "installation which connects the termination location of the network at the premises of the subscriber to the main distributor or to any other equivalent installation of a fixed electronic communications network open to the public". In the case of a switched telephone network, the local loop is a twisted copper pair, referred to as the "local copper loop". Furthermore, a local copper sub-loop corresponds to the portion of the local copper loop connecting the subscriber to the sub-distributor.

It will also be appreciated that the local loop is not necessarily constructed with a twisted pair of copper wires, but may also be constructed by a wireless connection. Furthermore, the local loop does not include the wire connections or other connections which the subscriber can install beyond the termination of the network.

Existing methods for establishing a session key often comprise:
 a step for authenticating the receiver and
 a step for constructing the session key, the step being completely carried out only if the receiver has been correctly authenticated during the authentication step.

The authentication step ensures that the receiver does belong to a user who is registered as a client of the operator of the network head. That licit user is referred to as a subscriber in this instance. In the remainder of this description, a user who attempts to receive the scrambled multimedia signals without having been registered to do so as a client of the operator of the network head will also be referred to as an "illicit user".

Conventionally, the receivers comprise a decoder in which a security processor which is typically removable, such as a chip type card, is inserted or integrated.

The decoders of the same operator of a network head are generally identical and only a series number, even if it is not systematically known by the operator, allows one decoder to be distinguished from the next. The secret pieces of information which allow a particular receiver to be identified and authenticated are recorded in the receiver, in particular in the security processor.

Nowadays, it is desirable to configure receivers which are able to function like the existing receivers but which do not use any security processor, whether removable or integrated in the decoder, and whether it is carried out by a software solution or a hardware solution.

In this context, for questions of security, it is not possible to record secret pieces of authentication information in a receiver even before the receiver has been allocated to a subscriber. Therefore, there is the problem of how to carry out the authentication step during the establishment of a session key when the receiver does not have any security processor or secret pieces of authentication information.

An object of the invention is to overcome this disadvantage by providing a method of establishing a session key which comprises a prior subscription step during which an identifier for the local loop, to the end of which the receiver must be connected, is acquired from pieces of information which are provided by a user who wishes to subscribe, and in which the authentication step comprises:
 a) when the receiver is connected to the network head by means of the network, an operation for automatically obtaining the identifier for the local loop, to the end of which the receiver is really connected in order to establish that connection with respect to the network head, from pieces of information provided by at least one piece of equipment of the network which is connected to the end of the local loop opposite the end to which the receiver is connected, and
 b) an operation for verifying that the identifier obtained during the operation a) corresponds to the identifier acquired during the subscription step in order to authenticate the receiver.

The pieces of equipment of the network connected to the end of the local loop are difficult to access and modify by any user, which allows a high level of confidence in the authenticity of the identifier for a local loop obtained during operation a). Consequently, verifying that the identifier for the local loop, to the end of which the receiver is really connected, does correspond to the identifier acquired during the subscription operation therefore ensures, with a high level of confidence, that the receiver who wishes to receive the multimedia signals transmitted by the network head really is that of the subscriber known by the operator as being associated with that local loop. Using the identifier for the local loop therefore allows authentication of the receiver with a high level of confidence even if that receiver does not have any security processor or secret pieces of authentication information.

The embodiments of this method may comprise one or more of the following features:

the operations a) and b) are reiterated each time the receiver is connected to the network head;

during the subscription step, the network head generates a unique activation code which is associated, in the network head, with the identifier acquired during the subscription step; before the operation b), the receiver has the activation code; when a connection is established with respect to the network head, the receiver transmits the activation code to the network head by means of the network; and, during the operation b), the network head uses the activation code received in order to establish correspondence between the identifier acquired during the subscription step and the local loop identifier obtained during the operation a);

the activation code is generated by the network head and is transmitted to the client, and the receiver acquires this activation code by means of a human/machine interface;

before the step b), the network head and the terminal generate, independently of each other, the activation codes in a unique manner on the basis of at least one identifier for the terminal known by both the terminal and the network head;

before the step for constructing the session key, the method comprises an activation step, during which either the receiver generates, by means of a random or pseudo-random generator, a pair of public/private keys $K_{STB-pub}/K_{STB-priv}$, then sends only the public key to the network head, or the network head generates, by means of a random or pseudo-random generator, a pair of public/private keys $K_{STB-pub}/K_{STB-priv}$, then sends that pair of keys to the receiver; and, subsequently, during the step for constructing the session key, the network head transmits, to the receiver by means of the network, secret items which are encrypted by means of the public key $K_{STB-pub}$ and the receiver decrypts those secret items by means of the private key $K_{STB-priv}$, those secret items which are exchanged between the network head and the receiver allowing the session key to be established;

the random or pseudo-random generator is further initialised on the basis of a unique identifier for the receiver;

during the step for constructing the session key, at least one cryptographic certificate of the public key $K_{STB-pub}$ is created then used, and the creation of the cryptographic certificate of the key $K_{STB-pub}$ is subject to the condition that the operation b) be successful;

the piece of equipment of the network providing those pieces of information which allow the identifier for the local loop to be obtained is a localisation server which, on the basis of an IP (Internet Protocol) address allocated to the receiver in order to connect to the network head, is capable of locating the identifier for the local loop, to the end of which the receiver is really connected in order to establish the connection.

Those embodiments of the method further have the following advantages:

reiterating the operations a) and b) during each connection operation prevents "nomadism", that is to say, the possibility of connecting a receiver to the end of a local loop other than the one which has been declared during the subscription operation;

being able to generate the pair of keys $K_{STB-pub}/K_{STB-priv}$ in the receiver then transmitting only the public key $K_{STB-pub}$ increases the security of the method because only the public key $K_{STB-pub}$ is transmitted over the network;

being able to generate the pair of keys $K_{STB-pub}/K_{STB-priv}$ in the network head then sending it to the receiver allows the processing power necessary in the receiver to be limited;

using the activation code allows an illicit user to be prevented from connecting his receiver to the line of a subscriber because, in that case, the illicit user does not know the activation code so that the authentication step cannot be successful;

initialising the random or pseudo-random generator using the unique identifier for the receiver ensures that two receivers which are activated with an identical activation code have a probability which is virtually zero of generating the same pair of public/private keys $K_{STB-pub}/K_{STB-priv}$;

using a localisation server which is capable of providing the identifier for a local loop, to which the receiver is really connected, on the basis of the IP address of the receiver simplifies the implementation of this method.

The invention also relates to a receiver of scrambled multimedia signals which is capable of establishing a common session key with a network head transmitting the scrambled multimedia signals by carrying out the above establishment method, wherein the receiver comprises a human/machine interface and is capable of acquiring the activation code by means of that human/machine interface and transmitting that activation code to the network head by means of the network.

The invention also relates to a receiver which is capable of generating, independently of the network head, an activation code in a unique manner from an identifier for the receiver known by both the receiver and the network head.

The embodiments of this receiver can comprise one or more of the following features:

the key generator of the receiver comprises a random or pseudo-random generator which is capable of generating the pair of public/private keys and in which the receiver is capable of sending only the public key to the network head;

the receiver comprises a unique identifier and the generator can be initialised on the basis of that unique identifier for the receiver.

The invention also relates to a network head which transmits scrambled multimedia signals and which is capable of establishing a common session key with a receiver of those scrambled multimedia signals by carrying out the above method of establishing a cryptographic key, and which, when the receiver is connected to the network head by means of the network, is capable of automatically obtaining the identifier for the local loop, to the end of which the receiver is really connected in order to establish that connection, from pieces of information which are provided by at least one piece of equipment of the network connected to the end of the local loop opposite the end to which the receiver is connected, and which is capable of verifying that the identifier obtained corresponds to the identifier acquired during the subscription step in order to authenticate the receiver.

The embodiments of this network head may comprise one or more of the following features:

the network head is capable of obtaining the identifier for a local loop and verifying that the identifier obtained corresponds to the identifier acquired during the subscription step each time the receiver is connected to the network head;

the network head is capable of using the activation code received in order to establish correspondence between the identifier acquired during the subscription step and the identifier for a local loop obtained.

Finally, the invention also relates to a method of transmitting scrambled multimedia signals between a network head, which transmits those scrambled multimedia signals, and a receiver of those scrambled multimedia signals, this method comprising;

a procedure for establishing a session key in accordance with the above method of establishing a cryptographic session key and a step for encrypting the check word or a message containing the check word, by means of the session key established, before it is transmitted from the network head to the receiver by means of the network.

The invention will be better understood from a reading of the following description which is given purely by way of non-limiting example and with reference to the drawings, in which.

Figure 1:
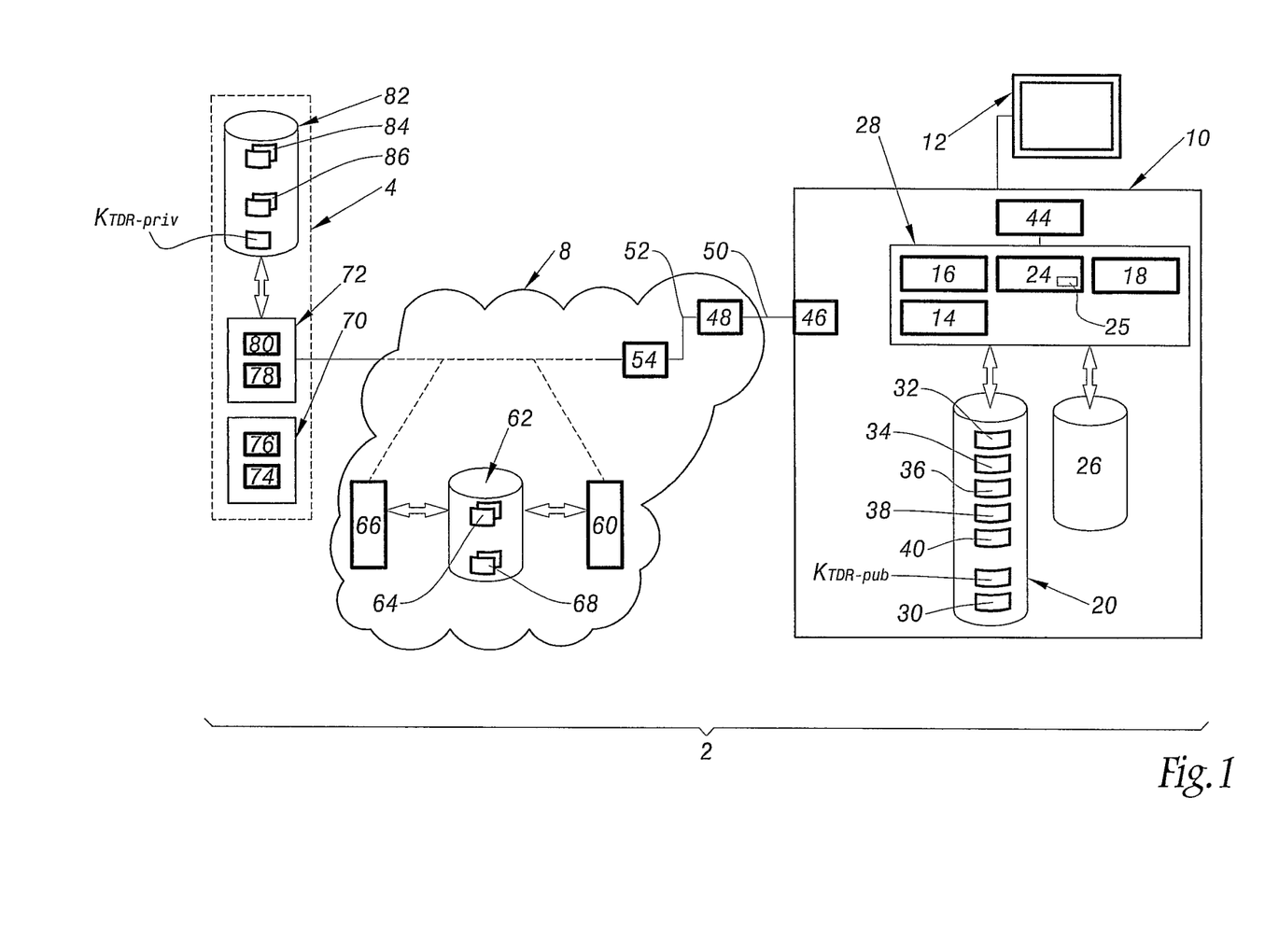
FIG. 1 is a schematic illustration of a system for transmitting scrambled multimedia signals between a network head and receivers.

FIG. 1 illustrates a system 2 for transmitting scrambled multimedia signals from a network head 4 to a plurality of receivers by means of a bi-directional telecommunications network 8.

In the remainder of this description, the characteristics and functions of the system 2 which are well-known to the person skilled in the art are not described in detail.

Furthermore, in order to simplify FIG. 1, only one receiver 10 has been depicted.

The multimedia signals are, for example, audio-visual programmes or pay television channels.

The receiver 10 is capable of decoding and unscrambling the multimedia signals received so as to generate a decoded and unscrambled audio-visual signal which can be displayed by a display device 12. The device 12 is a television set in this instance. The device 12 is directly connected to the receiver 10, for example, by means of a wire connection.

The receiver 10 in particular comprises:
an unscrambler 14 which is capable of unscrambling the scrambled multimedia signals by means of a check word CW,
an encrypting/decrypting module 16 which is capable, inter alia, of decrypting a cryptogram CW* of the check word CW contained in an ECM message (Entitlement Control Message) which is transmitted by the network head 4,
a module 18 for calculating a unique identifier STB-ID of the receiver 10 on the basis of pieces of information recorded in a ROM memory (Read Only Memory) 20, and
a generator 24 of cryptographic keys.

To this end, the generator 24 comprises a random or pseudo-random generator 25 which is capable of being initialised on the basis of the identifier STB-ID calculated by the module 18.

The receiver 10 also comprises the ROM memory (Read Only Memory) 20 and a non-volatile re-writable memory 26. The memory 26 is, for example, an NVRAM (Non Volatile Random Access Memory).

The unscrambler 14, the modules 16 and 18, and the generator 24 are, for example, constructed from a programmable electronic processor 28 which is capable of executing instructions which are recorded in the memory 20. To that end, the memory 20 comprises instructions 30 for executing the method of the FIGS. 2A and 2B when those instructions are executed by the processor 28.

The memory 20 comprises in this instance, by way of illustration:
an identifier 32 for the operator of the network head 4,
an identifier 34 for the constructor of the receiver 10,
an identifier 36 for the model and type of the receiver 10,
a series number 38 which is preferably random,
a MAC address (Media Access Control) 40, and
a public cryptographic key $K_{TDR-pub}$ which allows encryption of pieces of information which are intended to be decrypted by means of a private cryptographic key $K_{TDR-priv}$, and which allows verification of the signature of pieces of information signed by means of that same private key.

It is assumed in this instance that all the receivers of the system 2 are of the same type and the same model and have all been produced by the same manufacturer and are all administered by the same operator of the network head 4, so that the identifiers 32, 34 and 36 and the instructions 30 and the public key $K_{TDR-pub}$ are the same in each of the receivers of the system 2. In this manner, a receiver of the system 2 differs from another receiver of the system 2 only owing to its series number 38 and its MAC address 40.

The receiver 10 also comprises a human/machine interface 44 which allows the acquisition of an activation code entered by a user of this receiver.

The receiver 10 also comprises a socket 46 which allows that receiver to be connected to a termination location 48 of the network 8 by means of a connection 50. The connection 50 may be a wire connection in accordance with, for example, the Ethernet standard, or a wireless connection in accordance with, for example, the WiFi standard (Wireless Local Area Network). The connection 50 may also be constructed by means of a private local network. That private connection 50 is not part of the local loop of the network 8.

The termination location 48 is located at the premises of the subscriber. In the embodiment described here, that location 48 is a telephone socket connected by means of a local loop 52 to a multiplexer or distributor 54 for access for digital subscriber lines.

The multiplexer 54 is more commonly known by the term DSLAM (Digital Subscriber Line Access Multiplexer). The multiplexer 54 is part of the network 8.

The line 52 is identified by an identifier LINE-ID among all the local loops which are connected to the network 8.

For example, the identifier LINE-ID is constructed on the basis of one, a plurality or all of the following pieces of information:
identifier for the server BAS (Broadband Access Server) to which the multiplexer 54 is connected,
identifier for the multiplexer 54, virtual path number of the output line of the multiplexer 54 in accordance with the ATM (Asynchronous Transfer Mode) standard, number of the virtual input path of the server BAS in accordance with the ATM standard, and number of the virtual circuit of the local loop 52 at the output of the multiplexer 54 in accordance with the ATM standard.

The network 8 is in this instance a packet switching network. For example, the network 8 is the Internet network which is more commonly known as the World Wide Web.

In order to allow the receiver 10 to access the Internet network 8, this network 8 comprises an Internet access provider 60 which is constructed on the basis of data-processing servers. This provider 60 is capable of allocating to the receiver 10 an IP (Internet Protocol) address which allows the receiver 10 to navigate over the network 8. To that end, the provider 60 is associated with a memory 62 which contains a database 64 in which there are stored, for each subscriber:

the IP address of the receiver used in order to navigate over the network 8 and complementary pieces of information about the subscriber and in particular the telephone number allocated by the operator of the network 8 to the local loop 52.

The telephone number allows the subscriber to receive telephone calls by means of the local loop 52 and the socket 48.

Conventionally, the provider 60 is positioned as a flow interrupter, that is to say that all the flows of information exchanged by means of the local loop 52 pass through the server(s) of the provider 60.

The network 8 also comprises a localisation server 66 which is capable of:

returning the identifier for a local loop LINE-ID which is associated with a telephone number and returning the identifier for a local loop LINE-ID which is associated with an IP address provided by the provider 60.

To that end, the server 60 is associated with the memory 62, that memory 62 also comprises a database 68 which associates the corresponding identifier for a local loop with each telephone number.

It will be appreciated that, in this instance, the multiplexer 54, the provider 60, the localisation server 66 and the memory 62 are considered to be pieces of equipment of the network 8. In greater detail, those pieces of equipment are connected to the end of the local loop 52 opposite the termination 48.

The network head 4 comprises:

a transmitter 70 of scrambled multimedia signals and a server 72 for establishing a session key $K_s$ which is capable of authenticating each receiver and constructing a common session key with any one of the receivers of the system 2.

The transmitter 70 particularly comprises:

a scrambler 74 which is capable of scrambling the multimedia signals to be transmitted by means of the check word CW and an encryption/decryption module 76 which is capable, inter alia, of creating the cryptogram CW* on the basis of the check word CW used by the scrambler 74 before transmitting it in an ECM message to the receivers of the system 2.

The key establishment server 72 comprises a module 78 for authenticating each receiver which wishes to receive the scrambled multimedia signals transmitted by the network head 4 and a module 80 for calculating the identifiers STB-ID.

The server 72 is connected to a memory 82 in which there are recorded:

a database 84 which contains, for each receiver of the system 10, the value of the identifiers 32 to 36, the series number 38 and the address 40, a database 86 which contains, for each local loop of the system 52, a field "LINE-ID" for containing the identifier LINE-ID acquired from pieces of information provided by the user during his subscription operation, a field "STB-ID" for receiving the identifier STB-ID, a field "CdA" for receiving an activation code, a field "$K_{STB}$" for recording the pair of private/public keys $K_{STB-priv}/K_{STB-pub}$, an indicator "Session under way" for recording the fact that a session is already in progress, an indicator "receiver invalidated" for recording the fact that a receiver is invalidated and an indicator "local loop invalidated" for recording the fact that the local loop LINE-ID is invalidated.

The memory 82 also comprises the private key $K_{TDR-priv}$ which allows decryption of the messages which have been encrypted by means of the public key $K_{TDR-pub}$ and which allows messages whose signature will be verified by means of that same public key to be signed.

The operation of the system 2 will now be described with reference to the method of FIGS. 2A and 2B in the particular case of the receiver 10.

During a step 100, the manufacturer of the receiver 10 stores, in the receiver, and provides, to the operator of the network, the identifier 32 of that operator, his own constructor identifier 34, the identifier for the receiver model 36, the series number 38 and the MAC address 40 of the receiver. During this step, those pieces of information are also recorded in the database 84. Furthermore, during that step, the receiver may calculate its own identifier STB-ID with the module 18 from the identifiers 32 to 40 and store it in the memory 26.

Subsequently, during a step 101, the module 80 calculates, from the pieces of information contained in the database 84, the identifier STB-ID of each of the receivers constructed and records it in the database 84. The steps 100 and 101 thus constitute the recording by the operator of each receiver 10 constructed for it.

Afterwards, the receiver 10 is acquired by a user:

either independently of the operator ("non-nominative" receiver): in this case, the operator does not know the identifier STB-ID of this receiver, or with the operator ("nominative" receiver): in this case, the operator knows the identifier STB-ID (explicitly or by the series number) of the receiver allocated to that user).

At that stage, during a step 102, this user obtains access to the subscribed network 8 with the Internet access provider 60. During this step 102, the provider 60 allocates an IP address to the user which allows him to navigate over the network 8. During the subscription operation for this access by the user of the receiver 10, the provider 60 associates, in the database 64, the IP address which he allocates to the receiver 10 with the telephone number of that user corresponding to the local loop 52. In accordance with the protocols commonly used in the IP type networks, this IP address allocated to the user can be static or dynamic, as when the DHCP protocol (Dynamic Host Configuration Protocol, RFC1531 of IETF) is carried out.

Subsequently, the network head 4 and the receiver 10 execute a procedure 103 for establishing a common session key $K_S$. This procedure comprises a subscription step 104, an off-line activation step 116 of the receiver, an on-line activation step 128 of the receiver and a step 160 for constructing the session key.

Initially, the user of the receiver 10 proceeds to the subscription step 104.

At the start of the step 104, the server 72 acquires the LINE-ID number which identifies the local loop, to the end of which the user wishes to connect the receiver 10, on the basis of pieces of information provided by that user.

For example, during a step 107, the server 72 acquires the telephone number corresponding to the local loop 52. During the step 107, the pieces of information provided by the user are provided vocally, by post or by electronic mail, for example.

Furthermore, in the event that the receiver 10 has been allocated to the user by the operator (nominative receiver), the server 72 also acquires the STB-ID identification of this receiver, for example, on the basis of the series number 38 with which the user provides it in the information which he communicates.

Subsequently, during a step 108, the server 72 interrogates the server 66 in order to automatically receive the identifier LINE-ID for the local loop corresponding to the telephone number acquired during the step 107. From that time, the identifier LINE-ID received during the step 108 is recorded in the field "LINE-ID" of the database 86 and is used as an identifier for the local loop, to the end of which the receiver 10 has to be connected. In the case of a nominative receiver, the identifier for the receiver STB-ID acquired during the step 107 is also recorded in the database 86 associated with that identifier LINE-ID. In the case of a non-nominative receiver, the field "STB-ID" associated with the identifier LINE-ID is left blank until the step 148, as will be described below.

Subsequently, during a step 110, the authentication module 78 generates a unique activation code. That activation code is typically constituted by a random value associated with a cryptographic redundancy which will allow the integrity and/or authenticity thereof to be verified when it is input by the user, as will be described below. Subsequently, during a step 112, the activation code generated during the step 110 is recorded in the database 86 in the field "CdA" associated with the identifier LINE-ID received during the step 108.

During a step 114, the activation code generated during the step 110 is sent to the user of the receiver 10 preferably using a communication means different from that used by the receiver 10 for connecting to the network head 4. For example, the activation code is sent by post or communicated by telephone to the user of the receiver 10.

Once the user of the receiver 10 has received the activation code, he proceeds to an off-line activation step 116 of the receiver 10.

At the start of the step 116, during a step 118, the receiver 10 acquires the activation code which the user communicates to it by means of the human/machine interface 44.

The receiver 10 verifies, by controlling the cryptographic redundancy, during a step 120, the integrity and/or authenticity of the activation code acquired during the step 118.

If the control of the cryptographic redundancy of the activation code is negative, the method returns, for example, to the step 118 so that the user can input his activation code again. The number of attempts for acquiring the activation code is preferably limited so that, when this limit is reached, no new activation code can be acquired unless, for example, the receiver 10 is re-initialised.

If the control of the cryptographic redundancy of the activation code is positive and if it had not already been carried out during the step 100, then, during a step 124, the receiver calculates, with the module 18, the identifier STB-ID from the pieces of information stored in the memory 20 and particularly from the identifiers 32, 34, 36, the series number 38 and the MAC address 40. The identifier STB-ID calculated is stored in the memory 26.

Subsequently, during the step 126, the generator 24 generates a pair of private/public keys $K_{STB-priv}/K_{STB-pub}$ and also records it in the memory 26. The pair of keys $K_{STB-priv}/K_{STB-pub}$ is generated by initialising the pseudo-random generator 25 by means of the identifier STB-ID calculated. Thus, even if two identical activation codes are input in two identical receivers, the pairs of private/public keys generated are different because the identifiers of each of those receivers are different. This prevents the use of two receivers connected in parallel at the socket 48 and activated by means of the same activation code.

Once the off-line activation is finished, an on-line activation step 128 is carried out.

At the start of the step 128, during a step 130, the receiver 10 connects to the network head 4 by means of the local loop 52 and the network 8 using the IP address which has been allocated to it by the Internet access provider 60.

Subsequently, during a step 132, the receiver 10 encrypts, by means of the public key $K_{TDR-pub}$, the concatenation of the activation code acquired during the step 118 and the public key $K_{STB-pub}$ generated during the step 124.

The activation code and the public key $K_{STB-pub}$ encrypted in this manner are included in a request for activation which the receiver 10 sends, during a step 134, to the network head 8 using the connection established during the step 130. That activation request also contains the identifier STB-ID and the IP address of the receiver.

When the network head 4 receives that activation request, it verifies, during a step 136, that the identifier STB-ID contained in that request corresponds to one of those recorded in the database 84. If this is not the case, during a step 138, the method stops because the network head 4 does not recognise this receiver as relating to the operator.

If the identifier STB-ID does belong to the database 84, the authentication module 78 carries out a step 139 for authenticating the receiver 10. At the start of the step 139, during an operation 140, the module 78 extracts the IP address of the receiver 10 from the activation request. Subsequently, still in the course of the operation 140, the module 78 sends that IP address to the localisation server 66 in order to obtain the identifier LINE-ID for the local loop, to the end of which the receiver 10 is really connected. In response, during an operation 142, the server 66 sends the identifier LINE-ID corresponding to the IP address received to the module 78. During the operation 142, for example, the server 66 first establishes the telephone number corresponding to the IP address received by means of the database 64 then, secondly, establishes the identifier LINE-ID corresponding to the telephone number from the database 68.

Subsequently, during an operation 144, the module 78 decrypts, by means of the private key $K_{TDR-priv}$, the activation code and the public key $K_{STB-pub}$ included in the activation request.

At that time, during an operation 146, the module 78 verifies that the identifier LINE-ID obtained during the operation 142 does in fact correspond to the identifier LINE-ID acquired during the step 108. To that end, because each activation code is unique and is allocated to a single identifier LINE-ID in the step 112, during the operation 146, the module 78 compares the two following activation codes:

the activation code contained in the activation request and the activation code associated, in the database 86, with the field "LINE-ID" containing the identifier LINE-ID sent by the server 66 during the operation 142.

The receiver 10 is correctly identified only in the event of correspondence between those two activation codes.

If this is so, the module 78 also compares, during a step 148, the identifier STB-ID contained in the activation request with the contents of the field "STB-ID" which is associated in the database 86 with the field "LINE-ID" containing the identifier LINE-ID obtained during the operation 142.

In the case of a nominative receiver, the field "STB-ID" has been occupied in the step 108; in this case, the module 78 verifies that the identifier STB-ID for the request is equal to the contents of the field "STB-ID".

In the case of a non-nominative receiver, the field "STB-ID" has been left blank in the step 108; the module 78 inserts the identifier STB-ID for the request in the field "STB-ID" and considers that the comparison of the identifier for the receiver is positive.

If the result of the step 148 is positive, during a step 150, the module 78 records in the database 86 the key $K_{STB-pub}$ in the field "$K_{STB-pub}$" which is associated with the field "LINE-ID" containing the identifier LINE-ID. During the step 150, the module 78 also deletes the activation code recorded in the field associated with the field "LINE-ID" containing the identifier LINE-ID so that this activation code can be used only once. At the end of the step 150, the receiver 10 is now activated.

If, during the operation 146, it is established that the identifier LINE-ID obtained at the server 66 does not correspond to the identifier LINE-ID acquired during the step 108, or if, during the step 148, it is established that the identifier STB-ID contained in the activation request does not correspond to the one associated with the identifier LINE-ID in the database 86, the method is stopped, during a step 152, and the receiver 10 is not activated. In particular, the key $K_{STB-pub}$ is not recorded in the field "$K_{STB-pub}$" associated with the identifier LINE-ID obtained during the operation 142.

Once the receiver 10 has been activated, the method proceeds to a step 160 for constructing a session key $K_S$.

At the start of this step 160, during a step 162, the receiver 10 generates a random number ALEA_STB. Subsequently, during a step 164, the receiver 10 encrypts the number ALEA_STB by means of the public key $K_{TDR-pub}$.

Subsequently, during a step 166, the number ALEA_STB encrypted in this manner and the identifier STB-ID are sent to the server 72 for establishing the key by means of the local loop 52.

When the server 72 receives those pieces of information, during a step 168, it verifies that the identifier STB-ID received does belong to the database 86. Otherwise, the method is stopped during a step 170.

If it is the case, the authentication module 78 proceeds to a step 172 for authenticating the receiver 10.

At the start of the step 172, during an operation 174, the module 78 establishes the IP address from which the message received originates and sends it to the localisation server 66 in order to obtain the identifier LINE-ID for the local loop, to the end of which the receiver 10 is really connected. In response, during an operation 176, the server 66 establishes from the databases 64 and 68 which identifier LINE-ID is associated with that IP address.

The server 66 sends to the module 78, during an operation 178, the identifier LINE-ID corresponding to the IP address sent during the operation 174.

Subsequently, during an operation 180, the module 78 verifies that the identifier obtained during the operation 178 corresponds to the identifier LINE-ID acquired during the step 108. More precisely, the module 78 compares, during the operation 180, the following two identifiers of local loops:

the identifier LINE-ID sent by the server 66 during the step 178 and the identifier LINE-ID contained in the field "LINE-ID" associated with the identifier STB-ID in the database 86.

Should those two identifiers of local loops correspond, the receiver is correctly authenticated. The server 72 then proceeds to a step 182, during which it verifies that the value of the indicator "Session under way" associated with the identifier STB-ID in the database 86 does not have the value "True". If so, during a step 184, the server 72 writes the value "True" in the indicator "Session under way" associated with the identifier STB-ID received.

If, during the step 180, the identifier LINE-ID sent by the server 66 does not correspond to the identifier LINE-ID recorded in the database 86 or if, during the step 182, the value of the indicator "Session under way" is already equal to "True", then the method is stopped, during a step 186. Thus, during the step 186, no session key is constructed.

At the end of the step 184, during a step 188, the server 72 decrypts the encrypted number ALEA_STB received by means of the private key $K_{TDR-priv}$.

Afterwards, during a step 190, the server 72 generates a random number ALEA_TDR.

At the end of the steps 188 and 190, during a step 192, the key $K_S$ is calculated by combining the random numbers ALEA_STB and ALEA_TDR. For example, an XOR (exclusive or) operation is carried out between the bits of those two random numbers.

Subsequently, during a step 194, the number ALEA_TDR is encrypted using the key $K_{STB-pub}$ which is associated with the identifier STB-ID received in the database 86.

The number ALEA_STB is also encrypted, during a step 196, by means of the session key $K_s$ which is calculated during the step 192.

During a step 198, the pieces of information encrypted during the steps 194 and 196 are transmitted to the receiver 10 by means of the network 8 and the local loop 52.

During a step 200, the receiver decrypts the number ALEA_TDR by means of the private key $K_{STB-priv}$, then, during a step 202, it calculates the session key $K_S$ by means of the number ALEA_STB generated during the step 162 and the number ALEA_TDR which is decrypted during the step 200. The calculation carried out during the step 202 is identical to the one carried out during the step 192 so that the session keys $K_s$ constructed by the server 72 and the receiver 10 are identical.

During a step 204, the receiver 10 decrypts the number ALEA_STB sent during the step 198 by means of the session key $K_s$ constructed during the step 202.

Subsequently, during a step 206, the receiver 10 compares the number ALEA_STB which is decrypted during the step 204 with the one generated during the step 162. Should those numbers ALEA_STB not correspond, the method is stopped during a step 208 and the unscrambling of the multimedia signals received by the receiver 10 is inhibited. For example, during the step 208, the session key $K_s$ constructed is deleted.

Otherwise, during a step 210, the receiver encrypts the number ALEA_TDR which is decrypted during the step 200 by means of the session key $K_s$ calculated during the step 202.

The number ALEA_TDR encrypted in this manner is sent, during a step 212, to the network head 4 by means of the local loop 52 and the network 8.

After receiving the encrypted number ALEA_TDR, the server 72 decrypts, during a step 214, that cryptogram by means of the session key $K_s$ calculated during the step 192.

Subsequently, during a step 216, the server 72 compares the number ALEA_TDR which is decrypted during the step 214 with the one generated during the step 190. Should those random numbers not correspond, the method is stopped during a step 218. The step 218 is, for example, identical to the step 208.

Otherwise, the step 160 ends successfully, that is to say that a session key $K_s$ common to the network head 4 and the receiver 10 has been constructed.

In the event of a successful outcome to the step 160, the next step is a step 230 for transmitting scrambled multimedia signals from the network head 4 to the receiver 10.

At the start of the step 230, during a step 232, the scrambler 74 scrambles the multimedia signals by means of a check word CW.

Subsequently, during a step 234, the module 76 encrypts the check word CW by means of the key $K_s$ or encrypts an ECM message containing the key CW by means of the key $K_s$. Once the steps 232 and 234 have been completed, the transmitter 70 sends, during a step 236, the scrambled signals and the ECM message to the receiver 10 by means of the network 8 and the local loop 52.

During a step 238, the receiver 10 receives those signals and decrypts the ECM message and/or the check word by means of the key $K_s$.

The check word which is decrypted in this manner is then used during a step 240 by the unscrambler 14 in order to unscramble the multimedia signals received by means of the local loop 52.

Finally, during a step 242, the unscrambled multimedia signals are decoded then displayed in a non-encrypted state by the device 12.

The step for constructing a session key and the step for transmitting multimedia signals are reiterated each time the receiver 10 is connected to the network head 4. Typically, the activation steps 116 and 128 are carried out only once during initial set-up of the receiver 10.

Figure 2A:
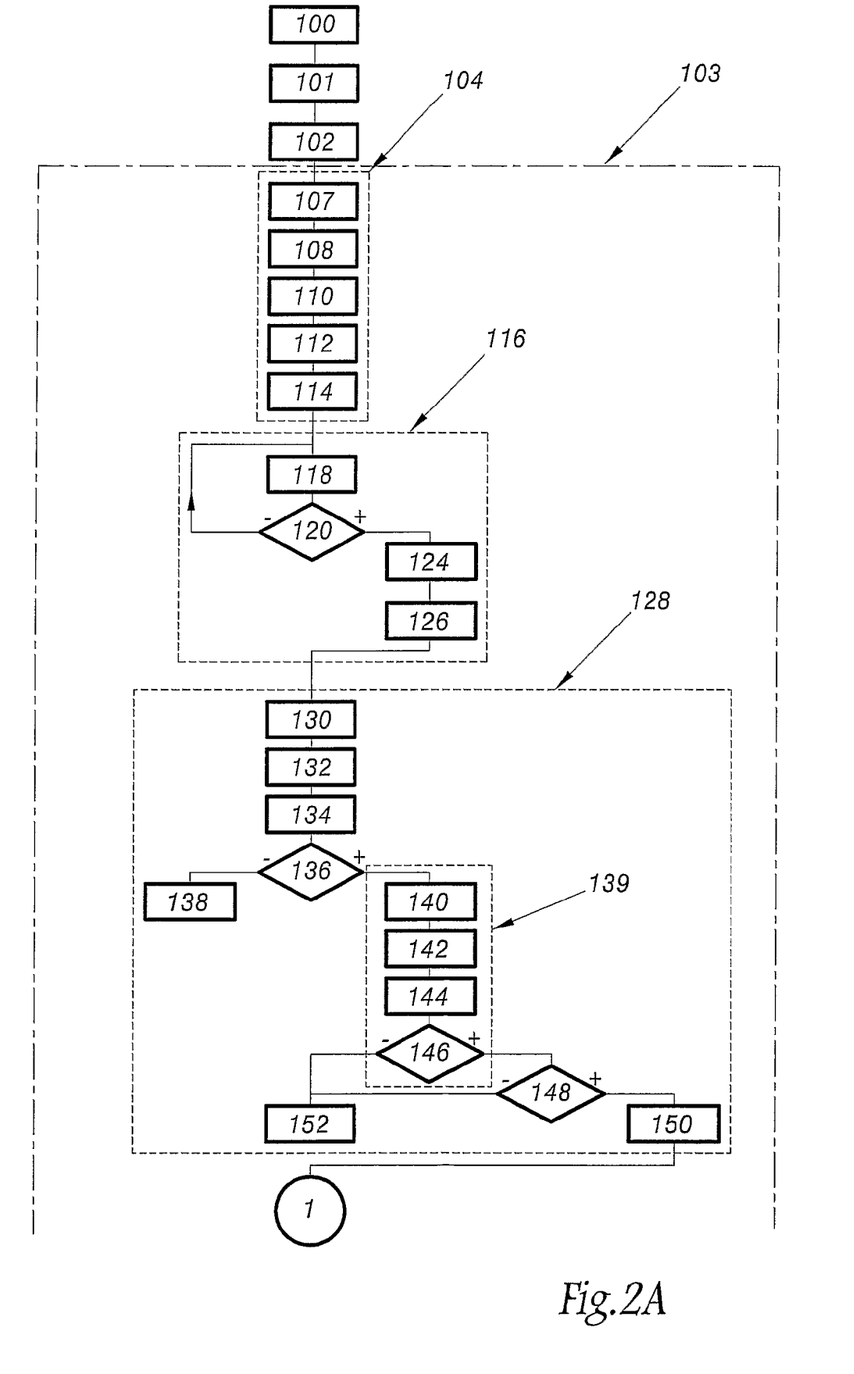
FIGS. 2A and 2B are flow charts of a method of transmitting multimedia signals in the system of FIG. 1, necessitating that a procedure for establishing a session key be carried out.
Figure 2B:
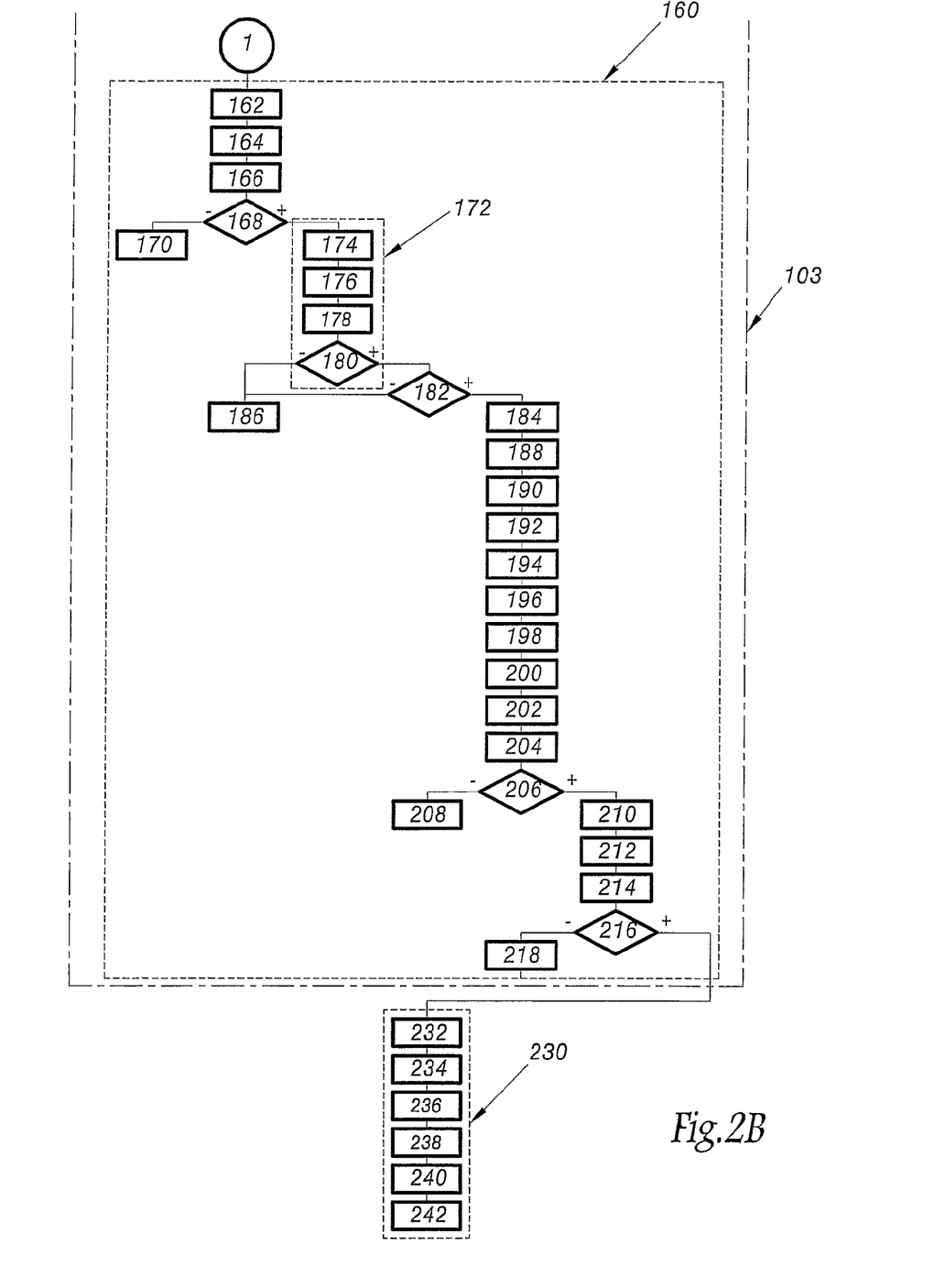
Figure 3:
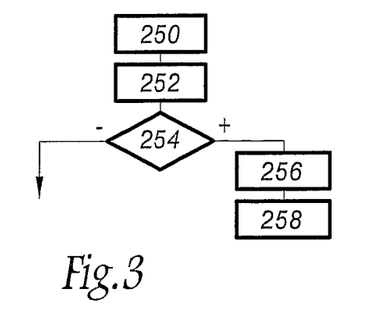
FIG. 3 is a method of invalidating a receiver of the system of FIG. 1.

FIG. 3 depicts a method of invalidating a receiver which can be combined with the method of FIGS. 2A and 2B.

Initially, the server 70 acquires, during a step 250, the series number of a receiver to be invalidated. A receiver must be invalidated, for example, if it has been stolen.

On the basis of this series number, the module 80 calculates the corresponding identifier STB-ID then, during a step 252, the server 72 records the value "True" in the indicator "Receiver Invalidated" which is associated with the identifier STB-ID calculated in the database 86.

Subsequently, the method of FIG. 2A (or 2B, respectively) is modified in such a manner that, each time the receiver 10 attempts to connect to the network head 4, the server 72 proceeds, during the step 148 and/or 182, to a verification operation 254 during which it is verified whether the value "True" is contained in the indicator "Receiver Invalidated" which is associated with the identifier STB-ID of the receiver which is attempting to connect to the network head 4.

If so, during a step 256, the server 72 then sends in response a request for invalidation to the receiver 10 by means of the network 8 and the local loop 52. It will thus be appreciated that the invalidation of a receiver is carried out on the initiative of the operator and without the knowledge of the user of the receiver.

When the receiver 10 receives this invalidation request, during a step 258, it carries out the deletion of all the secret items necessary for the operation of the receiver 10 and in particular the deletion of the pair of keys $K_{STB-pub}/K_{STB-priv}$. Consequently, the step for constructing a session key can no longer be carried out so that the receiver 10 can no longer unscramble the scrambled multimedia signals which it might receive.

Should the value recorded in the indicator "Receiver Invalidated" be different from "True", the method is carried out as described with reference to FIG. 2A by the step 150 (FIG. 2B, step 184, respectively).

Figure 4:
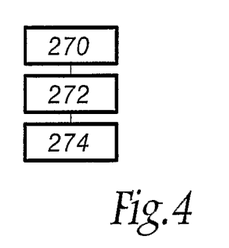
FIG. 4 is a flow chart of a method of invalidating a local loop in the system of FIG. 1.

FIG. 4 illustrates a method of invalidating a local loop which can be implemented by slightly modifying the method of FIGS. 2A and 2B.

Initially, during a step 270, the network head 4 acquires the identifier LINE-ID of the local loop to be invalidated.

Subsequently, during a step 272, the server 70 records the value "True" in the indicator "Invalidated Local Loop" which is associated with the identifier LINE-ID acquired, during the step 270, in the database 86.

Subsequently, during a step 274, on the basis of the identifier LINE-ID acquired during the step 270, the server 72 retrieves the identifiers STB-ID of each of the receivers which are associated with that local loop and carries out the invalidation of each of those receivers in accordance with, for example, the method of FIG. 3.

A number of embodiments of the system 2 and the method of FIGS. 2A and 2B are possible. For example, in the case of non-nominative receivers, the database 84 is not necessary and the step 136 involving verification that the identifier STB-ID received by the network head belongs to the database 84 is omitted.

The step 172 can be omitted so that, once activated, a receiver can be used in order to unscramble the scrambled multimedia signals even if it is connected to a local loop other than the one identified at the subscription step 104 during the on-line activation step.

The step 182 can also be omitted, which allows a plurality of sessions with the network head 4 to be established simultaneously.

In the event that the series number or an identifier for the receiver 10 is transmitted during the subscription step, the method of FIG. 2 can be adapted in order not to use any activation code. For example, the identifier STB-ID contained in the activation request is used instead and in place of the activation code in order to establish correspondence between the identifiers which are acquired during the step 108 and obtained during the step 142. In that event, the human/machine interface 44 may be omitted, the step 116 is omitted and the steps 132, 144 and 146 are consequently adapted.

The identifier STB-ID can be recorded in the memory 26 or in the memory 20 in encrypted form by means of a key which is common to all the receivers of the operator of the network head 4.

The system 2 has been described in the particular case in which the technology used to transmit scrambled multimedia signals from the network head 4 to the receiver 10 is a technology referred to as being from the family xDSL (Digital Subscriber Line). In a variant, however, other telecommunications networks can be used, provided that it is possible to identify the local loop which is really used by the receiver 10 in order to connect to the network head 4 from pieces of equipment of the network which are connected to the end opposite the one to which the receiver used is connected. In the system 2, the pieces of equipment of the network used for that purpose are the access provider 60 and the localisation server 66. In a variant, however, the multiplexer 54 may be modified so as to automatically insert the identifier LINE-ID for the local loop 52 in each message transmitted from the receiver 10 to the network head 4.

Figure 5:
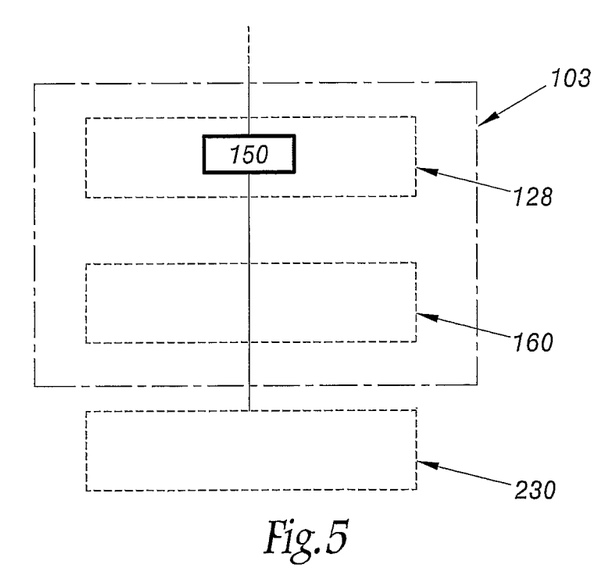
FIG. 5 is a flow chart of a variant of the method of FIGS. 2A and 2B in order to generate the private key/public key pair.

The method of the FIGS. 2A and 2B can also be modified in accordance with FIG. 5 in order to use cryptographic certificates of the public keys $K_{TDR\text{-}pub}$ and $K_{STB\text{-}pub}$. FIG. 5 illustrates only the steps which are modified in relation to the method of FIGS. 2A and 2B.

In this variant, each receiver further contains a public key $K_{AC\text{-}pub}$ of a certification authority, typically in a cryptographic certificate $C_{AC}$ which is constructed by means of the private key $K_{AC\text{-}priv}$ corresponding to the public key $K_{AC\text{-}pub}$. In the event of on-line activation, when the receiver transmits the public key $K_{STB\text{-}pub}$ at the step 134, it also asks that a certificate $C_{STB}$ of that public key be established by the network head. This certificate $C_{STB}$ is only established if the receiver 10 is correctly authenticated, as at the end of the steps 139 and 148. During the step 150, the network head further transmits the key $K_{STB\text{-}pub}$ to a certification authority which constructs the certificate $C_{STB}$ of the key $K_{STB}$ pub which is signed by means of the private key $K_{AC\text{-}priv}$ and the certificate $C_{STB}$ constructed in this manner is then sent to the receiver. Subsequently, during the step 160, the session key $K_S$ is constructed. In order to construct this key, existing protocols which allow mutual authentication to be carried out with an exchange of certificates may be used. By way of example, the protocol SSL (Secure Sockets Layer) may be used. Such a protocol may be adapted in order further to verify the identifier STB-ID for the receiver, as at the step 168, the identifier LINE-ID for the local loop of the user, as at the step 180, and/or the existence of a session in progress, as at the step 182.

Figure 6:
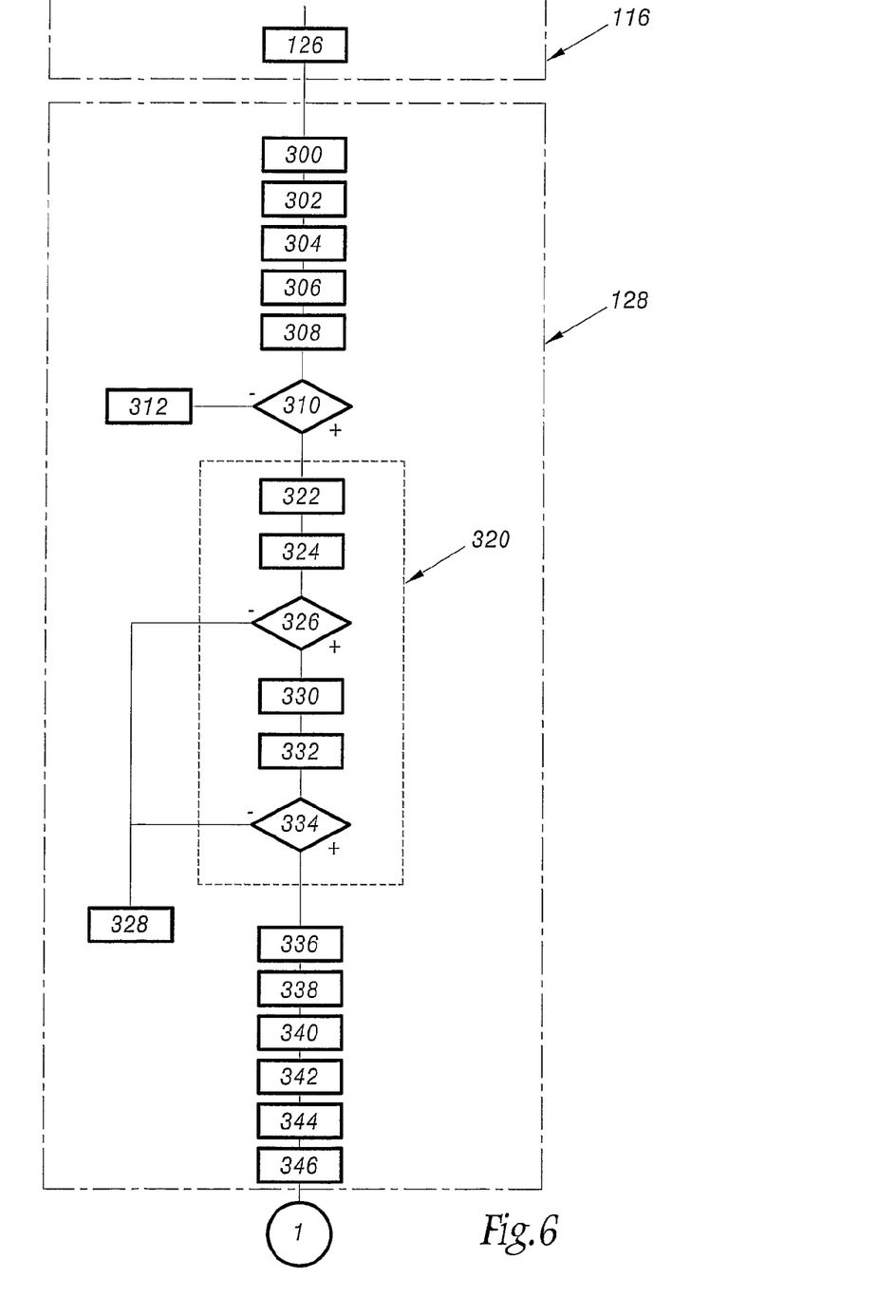
FIG. 6 is a flow chart of another variant of the method of FIGS. 2A and 2B in order to generate the private key/public key pair.

The method of the FIGS. 2A and 2B can also be modified in accordance with FIG. 6 so that the pair of keys of the receiver $K_{STB\text{-}priv}/K_{STB\text{-}pub}$ is not generated in the receiver, but instead in the network head.

In this variant, the off-line activation 116 described in FIG. 2A does not comprise the step 126 for generating the pair of keys $K_{STB\text{-}priv}/K_{STB\text{-}pub}$ by the receiver, and the on-line activation step 128 is modified as follows.

At the start of the on-line activation step 128, during a step 300, the receiver 10 calculates a secret key, referred to as the activation key, for example, on the basis of the identifier STB-ID, the activation code acquired during the step 118 and a random value which is generated by the receiver. During a step 302, the receiver encrypts the activation code with the activation key obtained.

Subsequently, during a step 304, the receiver 10 connects to the network head 4 by means of the local loop 52 and the network 8 using the IP address which has been allocated to it by the Internet access provider 60. During this connection operation, if the public key of the network head $K_{TDR\text{-}pub}$ has not been pre-loaded in the memory 20 of the receiver, it can receive this key, for example, in an auto-signed certificate.

During a step 306, the receiver encrypts, with the key $K_{TDR\text{-}pub}$, the concatenation of the random value generated in the step 300 and the cryptogram of the activation code generated in the step 302. The cryptogram obtained in this matter is included in an activation request which the receiver 10 sends, during a step 308, to the network head 8 using the connection established during the step 304. This activation request also contains the identifier STB-ID and the IP address of the receiver.

When the network head 4 receives that activation request, it verifies, during an operation 310, that the identifier STB-ID contained in that request corresponds to one of those recorded in the database 84. If that is not the case, during a step 312, the method stops because the network head 4 does not recognise that receiver as relating to the operator.

If the identifier STB-ID does belong to the database 84, the authentication module 78 carries out a step 320 for authenticating the receiver 10. At the start of the step 320, during an operation 322, the module 78 obtains the identifier LINE-ID of the receiver by calling the localisation server 66 as in the steps 140, 142 and 144 described above.

Subsequently, during an operation 324, the module 78 obtains, by decrypting by means of the private key $K_{TDR\text{-}priv}$, the random value and the cryptogram which are included in the activation request.

At that time, during an operation 326, the module 78 searches in the database 86 for an identifier LINE-ID which is acquired during the step 108 corresponding to the identifier LINE-ID which is obtained during the operation 322 and verifies that the identifier STB-ID associated with that identifier LINE-ID in the database 86 does correspond to the identifier STB-ID which is sent in the activation request in the step 308. In the case of a non-nominative receiver, the field "STB-ID" is blank and the result of that operation is considered to be positive.

If the result of the operation 326 is positive, the network head calculates, in a step 330, a secret key on the basis of the random value which is decrypted during the step 324, the identifier STB-ID and the activation code which are associated with the identifier LINE-ID in the database 86, in accordance with the same method used by the receiver in the step 300 in order to calculate the activation key. During a step 332, the network head decrypts the activation code with that secret key.

Subsequently, during an operation 334, the module 78 compares the following two activation codes:
 the activation code which is from the activation request and which is decrypted in the step 332 and
 the activation code which is associated in the database 86 with the field "LINE-ID" containing the identifier LINE-ID which is sent by the server 66 during the operation 322.

The receiver 10 is correctly identified only in the event of correspondence between those two activation codes.

If the result of the step 334 is positive, during a step 336, in the case of a non-nominative receiver, the module 78 inserts the identifier STB-ID of the request in the field "STB-ID" associated with the identifier LINE-ID.

Subsequently, during a step 338, the module 78 generates a pair of private/public keys $K_{STB\text{-}priv}/K_{STB\text{-}pub}$ and a certificate of the public key $K_{STB\text{-}pub}$. Furthermore, that pair of keys generated is recorded in the database 86 in the field "$K_{STB}$" which is associated with the field "LINE-ID" containing the identifier "LINE-ID".

Subsequently, during a step 340, the network head encrypts the private key $K_{STB\text{-}priv}$ with the secret key obtained in the step 332. From the above, it will be understood that, in this instance, the secret key is identical to the activation key of the receiver. The cryptogram of the key $K_{STB\text{-}priv}$ obtained in this manner and the certificate of the key $K_{STB\text{-}pub}$ are then sent to the receiver during a step 342. In the step 344, the receiver decrypts, with the activation key, the private key $K_{STB\text{-}priv}$ received and stores it in the memory 26. Furthermore, if the verification of the certificate received is positive, it extracts the public key $K_{STB\text{-}pub}$ and stores it in the memory 26. The receiver then has its pair of private/public keys $K_{STB\text{-}priv}/K_{STB\text{-}pub}$.

Finally, during the step 346, the module 78 deletes the activation code recorded in the field which is associated with the field "LINE-ID" containing the identifier LINE-ID so that this activation code can be used only once. At the end of the step 346, the receiver 10 is now activated.

If, during the operation 326, it is established that the identifier STB-ID received in the activation request does not correspond to the identifier STB-ID which is associated with the identifier LINE-ID in the database 86, or if, during the step 334, it is established that the activation code contained in the activation request does not correspond to the one associated with the identifier LINE-ID in the database 86, during a step 328, the method stops and the receiver 10 is not activated. In particular, the receiver does not receive the keys $K_{STB\text{-}pub}/K_{STB\text{-}priv}$ which are necessary for subsequent exchanges with the network head. The remainder of the method of FIG. 6 is, for example, identical to that of the FIGS. 2A and 2B.

In another variant of the method of FIG. 2A, the activation code is not transmitted to the subscriber in order to be input into the receiver by the user, but instead it is generated by the receiver during the off-line activation step 116. In this variant, the network head and the receiver have the same secret algorithm in order to generate the activation code which does not comprise any random element, but only parameters which are specific to the receiver. Those parameters are known both by the network head and the receiver. For example, one of the parameters is an identifier for the receiver, such as the identifier STB-ID. Those parameters are generated and recorded in the receiver during its manufacture. The step 144 for sending the activation code to the user is omitted. During the off-line activation step 116, at the step 118, the receiver 10 generates its activation code in accordance with the secret algorithm and the operation 120 for verifying the code input by the user is omitted. This variant avoids the provision of specific logistics in order to communicate this activation code to the user and the associated dialogue function in the receiver.

The invention claimed is:

1. A method of establishing a cryptographic session key which is common to a network head which transmits scrambled multimedia signals and a receiver of those scrambled multimedia signals capable of unscrambling the signals received by means of a check word, the method comprising:
   recognizing a first connection of the receiver to the network head through a telecommunications network via any local loop of a plurality of local loops within the telecommunications network that are each uniquely identified among the plurality of local loops by an identifier of the local loop and each directly connected, at a first end of the local loop, to a respective termination location installed at a premises of a subscriber to the telecommunications network and, at a second end of the local loop, to at least one piece of network equipment that is part of a center for connection to the telecommunications network managed by a telecommunications service provider and with limited or restricted physical access by subscribers to the telecommunications network;
   upon the receiver connecting to the network head in the first connection, automatically obtaining the identifier of the local loop via which the receiver is connected to the network head by way of a connection to the respective termination location connected to the local loop at the first end of the local loop using pieces of information provided by the at least one piece of network equipment connected to the local loop at the second end of the local loop via which the receiver is connected to the network head;
   verifying that the identifier obtained for the local loop via which the receiver is connected to the network head in the first connection corresponds to a previously obtained identifier acquired prior to the receiver connecting to the network head in the first connection of a local loop of the plurality of local loops for which the respective termination location connected to the local loop identified by the previously obtained identifier at the first end of the local loop is located at the premises of a subscriber to the telecommunications network associated with the receiver to authenticate the receiver; and
   upon the receiver being authenticated, completing construction of the cryptographic session key only if the receiver has been correctly authenticated by verifying that the identifier obtained for the local loop via which the receiver is connected to the network head in the first connection corresponds to the previously obtained identifier,
   wherein the previously obtained identifier is acquired using pieces of information provided by the subscriber associated with the receiver during a subscription operation in which a determination is made that the receiver must be connected to the respective termination location installed at the premises of the subscriber for the receiver to be authenticated; and wherein:
   during the subscription operation, the network head generates a unique activation code which is associated, in the network head, with the previously obtained identifier acquired during the subscription operation,
   prior to verification that the identifier obtained for the local loop via which the receiver is connected to the network head in the first connection corresponds to the previously obtained identifier acquired prior to the receiver connecting to the network head in the first connection being performed, the receiver obtains the activation code,
   upon the first connection being established with respect to the network head, the receiver transmits the activation code to the network head via the network, and
   during verification that the identifier obtained for the local loop via which the receiver is connected to the network head in the first connection corresponds to the previously obtained identifier acquired prior to the receiver connecting to the network head in the first connection, the network head uses the activation code received from the receiver to establish correspondence between the previously obtained identifier acquired prior to the receiver connecting to the network head in the first connection and the identifier obtained for the local loop via which the receiver is connected to the network head in the first connection.

2. The method according to claim 1, wherein, for each connection of the receiver to the network head via any local loop of a plurality of local loops within the telecommunications network that are each uniquely identified, the operations of recognizing the connection of the receiver to the network head, automatically obtaining the identifier of the local loop via which the receiver is connected to the network head, and verifying that the identifier obtained for the local loop via which the receiver is connected to the network head in the connection corresponds to the previously obtained identifier acquired prior to the receiver connecting to the network head in the connection are performed to authenticate the receiver.

3. The method according to claim 1, wherein the activation code is generated by the network head and transmitted to the subscriber, and wherein the receiver acquires the activation code from the subscriber via a user interface.

4. A receiver that is configured to establish a session key with a network head via performance of the method of claim 3, wherein the receiver comprises a user interface, and wherein the receiver is capable of acquiring the activation code, by means of the user interface, and transmitting the activation code acquired to the network head via the network.

5. The receiver according to claim 4, wherein, prior to construction of the session key:
either the receiver generates, via a random or pseudo-random generator, a pair of public/private keys $K_{STB-pub}/K_{STB-priv}$, then sends only the public key to the network head, or the network head generates, via a random or pseudo-random generator, a pair of public/private keys $K_{STB-pub}/K_{STB-priv}$, then sends that pair of keys to the receiver and, subsequently,
during construction of the session key, the network head transmits, to the receiver via the network, secret items which are encrypted by means of the public key $K_{STB-pub}$, and the receiver decrypts the secret items using the private key $K_{STB-priv}$ to allow for the session key to be established, and
wherein the receiver is capable of sending only the public key among the pair of public/private keys generated to the network head.

6. The receiver according to claim 5, wherein the receiver is provided with at least one unique identifier, and wherein the random or pseudo-random generator is further initialized based on the at least one unique identifier for the receiver.

7. The method according to claim 1, wherein, prior to verification that the identifier obtained for the local loop via which the receiver is connected to the network head in the first connection corresponds to the previously obtained identifier acquired prior to the receiver connecting to the network head in the first connection being performed, the network head and the receiver generate, independently of each other, the activation code in a unique manner based on at least one identifier for the receiver known by both the receiver and the network head.

8. A receiver that is configured to establish a session key with a network head via performance of the method of claim 7, wherein the receiver is capable of generating, independently of the network head, the activation code in a unique manner based on the identifier for the receiver known by both the receiver and the network head.

9. The method according to claim 1, wherein, prior to construction of the cryptographic session key:
either the receiver generates, via a random or pseudo-random generator, a pair of private/public keys $K_{STB-pub}/K_{STB-priv}$, then sends only the public key to the network head, or the network head generates, via a random or pseudo-random generator, a pair of public/private keys $K_{STB-pub}/K_{STB-priv}$, then sends that pair of keys to the receiver and, subsequently,
during construction of the cryptographic session key, the network head transmits, to the receiver via the network, secret items that are encrypted by means of the public key $K_{STB-pub}$, and the receiver decrypts those secret items using the private key $K_{STB-priv}$ to allow for the session key to be established.

10. The method according to claim 9, wherein the receiver is provided with at least one unique identifier, and wherein the random or pseudo-random generator is initialized the at least one unique identifier for the receiver.

11. The method according to claim 9, wherein, during generation of the pair of public/private keys, at least one cryptographic certificate of the public key $K_{STB-pub}$ is created then used, and wherein creation of the cryptographic certificate of the key $K_{STB-pub}$ is subject to a condition that the operation of verifying that the identifier obtained for the local loop via which the receiver is connected to the network head in the first connection corresponds to the previously obtained identifier acquired prior to the receiver connecting to the network head in the first connection be successful.

12. The method according to claim 1, wherein the at least one piece of network equipment connected to the local loop at the second end of the local loop via which the receiver is connected to the network head that provides the pieces of information used to obtain the identifier of the local loop via which the receiver is connected to the network head is a localization server which, based on an IP (Internet Protocol) address allocated to the receiver to connect to the network head, is capable of locating the identifier for the local loop via which the receiver is connected to the network head in the first connection.

13. A network head that is configured to transmit scrambled multimedia signals and establish a session key with a receiver of those scrambled multimedia signals via performance of the method of claim 1,
wherein, upon the receiver connecting to the network head in the first connection through the telecommunications network via any local loop of the plurality of local loops within the telecommunications network, the network head is capable of automatically obtaining the identifier of the local loop via which the receiver is connected to the network head by way of a connection to the respective termination location connected to the local loop at the first end of the local loop using pieces of information provided by the at least one piece of network equipment connected to the local loop at the second end of the local loop via which the receiver is connected to the network head, and verifying that the identifier obtained for the local loop via which the receiver is connected to the network head in the first connection corresponds to a previously obtained identifier acquired prior to the receiver connecting to the network head in the first connection to authenticate the receiver.

14. The network head according to claim 13, wherein, for each connection of the receiver to the network head via any local loop of a plurality of local loops, the operations of recognizing the connection of the receiver to the network head, automatically obtaining the identifier of the local loop via which the receiver is connected to the network head, and verifying that the identifier obtained for the local loop via which the receiver is connected to the network head in the connection corresponds to the previously obtained identifier acquired prior to the receiver connecting to the network head in the connection are performed by the network head to authenticate the receiver.

15. The network head according to claim 13, wherein,
during the subscription operation, the network head generates a unique activation code which is associated, in the network head, with the previously obtained identifier acquired during the subscription operation,
prior to verification that the identifier obtained for the local loop via which the receiver is connected to the network head in the first connection corresponds to the previously obtained identifier acquired prior to the receiver connecting to the network head in the first connection being performed, the receiver has the activation code,
upon the receiver connecting to the network head in the first connection, the receiver transmits the activation code which it has to the network head via the network, and
during verification that the identifier obtained for the local loop via which the receiver is connected to the network head in the first connection corresponds to the previously obtained identifier acquired prior to the receiver connecting to the network head in the first connection, the network head uses the activation code received from the receiver to establish correspondence between the previously obtained identifier acquired during the subscription operation and the identifier obtained for the local loop via which the receiver is connected to the network head in the first connection.

16. The method according to claim 1, wherein the identifier of each local loop of the plurality of local loops is constructed based on at least one of an identifier for an access server to which the at least one piece of network equipment that is connected at the second end of the local loop is connected, an identifier for the at least one piece of network equipment that is connected at the second end of the local loop, a virtual path identifier of an output line of the at least one piece of network equipment that is connected at the second end of the local loop, a virtual path identifier of an input line of the access server, and an identifier of a virtual circuit of the local loop at an output of the at least one piece of network equipment that is connected at the second end of the local loop.

17. The method according to claim 1, wherein at least one of a series number or a network interface identifier is uniquely assigned to the receiver by a manufacturer of the receiver, wherein, during the subscription operation, an IP address is assigned to the subscriber and associated with subscriber information allocated to the local loop to which the respective termination location to which it is determined that the receiver must be connected for the receiver to be authenticated is connected at the second end of the local loop, wherein the subscriber information is acquired by the network head using the pieces of information provided by the subscriber during the subscription operation, and wherein the previously obtained identifier is acquired by the network head using the acquired subscriber information.

18. The method according to claim 17, wherein the IP address is assigned to the subscriber independently of the previously obtained identifier of the local loop to which the respective termination location to which it is determined that the receiver must be connected for the receiver to be authenticated is connected at the second end of the local loop.

19. The method according to claim 17, wherein a unique identifier for the receiver is calculated based on the series number or the network interface identifier assigned to the receiver, and wherein the network head associates the unique identifier calculated for the receiver based on the series number or the network interface identifier assigned by the manufacturer of the receiver with the previously obtained identifier acquired using the acquired subscriber information.

20. A method of transmitting scrambled multimedia signals between a network head and a receiver capable of receiving said scrambled multimedia signals, the receiver also being capable of unscrambling the signals received by means of a check word, the method comprising:

recognizing a first connection of the receiver to the network head through a telecommunications network via any local loop of a plurality of local loops within the telecommunications network that are each uniquely identified among the plurality of local loops by an identifier of the local loop and each directly connected, at a first end of the local loop, to a respective termination location installed at a premises of a subscriber to the telecommunications network and, at a second end of the local loop, to at least one piece of network equipment that is part of a center for connection to the telecommunications network managed by a telecommunications service provider and with limited or restricted physical access by subscribers to the telecommunications network;

upon the receiver connecting to the network head in the first connection, automatically obtaining the identifier of the local loop via which the receiver is connected to the network head by way of a connection to the respective termination location connected to the local loop at the first end of the local loop using pieces of information provided by the at least one piece of network equipment connected to the local loop at the second end of the local loop via which the receiver is connected to the network head;

verifying that the identifier obtained for the local loop via which the receiver is connected to the network head in the first connection corresponds to a previously obtained identifier acquired prior to the receiver connecting to the network head in the first connection of a local loop of the plurality of local loops for which the respective termination location connected to the local loop identified by the previously obtained identifier at the first end of the local loop is located at the premises of a subscriber to the telecommunications network associated with the receiver to authenticate the receiver;

upon the receiver being authenticated, completing construction of the cryptographic session key only if the receiver has been correctly authenticated by verifying that the identifier obtained for the local loop via which the receiver is connected to the network head in the first connection corresponds to the previously obtained identifier; and encrypting the check word or a message containing the check word using the constructed session key prior to the check word being transmitted from the network head to the receiver via the network;

wherein the previously obtained identifier is acquired using pieces of information provided by the subscriber associated with the receiver during a subscription operation in which a determination is made that the receiver must be connected to the respective termination location installed at the premises of the subscriber for the receiver to be authenticated; and wherein during the subscription operation, the network head generates a unique activation code which is associated, in the network head, with the previously obtained identifier acquired during the subscription operation, prior to verification that the identifier obtained for the local loop via which the receiver is connected to the network head in the first connection corresponds to the previously obtained identifier acquired prior to the receiver connecting to the network head in the first connection being performed, the receiver obtains the activation code, upon the first connection being established with respect to the network head, the receiver transmits the activation code to the network head via the network, and during verification that the identifier obtained for the local loop via which the receiver is connected to the network head in the first connection corresponds to the previously obtained identifier acquired prior to the receiver connecting to the network head in the first correction, the network head uses the activation code received from the receiver to establish correspondence between the previously obtained identifier acquired prior to the receiver connecting to the network head in the first connection and the identifier obtained for the local loop via which the receiver is connected to the network head in the first connection.

* * * * *